US011861814B2

(12) United States Patent
Seo et al.

(10) Patent No.: US 11,861,814 B2
(45) Date of Patent: Jan. 2, 2024

(54) APPARATUS AND METHOD FOR SENSING IMAGE BASED ON EVENT

(71) Applicant: Electronics and Telecommunications Research Institute, Daejeon (KR)

(72) Inventors: Jeong-Il Seo, Daejeon (KR); Hyon-Gon Choo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 177 days.

(21) Appl. No.: 17/318,828

(22) Filed: May 12, 2021

(65) Prior Publication Data

US 2022/0207672 A1    Jun. 30, 2022

(30) Foreign Application Priority Data

Dec. 31, 2020    (KR) .......................... 10-2020-0188660

(51) Int. Cl.
*G06T 5/20*    (2006.01)
*G06T 5/50*    (2006.01)
(Continued)

(52) U.S. Cl.
CPC ................ *G06T 5/20* (2013.01); *G06T 5/007* (2013.01); *G06T 5/50* (2013.01); *H04N 23/71* (2023.01); *H04N 23/741* (2023.01)

(58) Field of Classification Search
CPC .. G06T 5/20; G06T 5/007; G06T 5/50; H04N 5/2351; H04N 5/2355; H04N 5/235;
(Continued)

(56) References Cited

U.S. PATENT DOCUMENTS 9,510,021 B2 * 11/2016 Cho ...................... H04N 19/86
9,934,557 B2 *  4/2018 Ji ............................ G06F 3/007
(Continued)

FOREIGN PATENT DOCUMENTS

JP        2020161993 A    10/2020
KR    1020140138537 A    12/2014
(Continued)

OTHER PUBLICATIONS

Gallego et al, Event-Based Vision: A Survey, IEEE Transactions on Pattern Analysis and Machine Intelligence, vol. 44, No. 1, Jan. 2022 (Year: 2022).*

(Continued)

*Primary Examiner* — Andrae S Allison
(74) *Attorney, Agent, or Firm* — William Park & Associates Ltd.

(57) ABSTRACT

Disclosed herein are an apparatus and method for sensing an image based on an event. The apparatus includes memory in which at least one program is recorded and a processor for executing the program. The program may perform acquiring at least one of brightness information and color information from an input image signal, performing conversion including at least one of filtering of at least one of the acquired brightness information and color information, color conversion, and brightness conversion, calculating a quantized difference between a first converted image converted from the currently input image signal and a second converted image converted from a previously input image signal, and generating event information for the input image signal as a bitstream based on the quantized difference.

18 Claims, 6 Drawing Sheets

(51) Int. Cl.
*G06T 5/00* (2006.01)
*H04N 23/71* (2023.01)
*H04N 23/741* (2023.01)

(58) Field of Classification Search
CPC .. H04N 5/232411; H04N 5/345; H04N 5/144; H04N 5/357; H04N 9/67; H04N 9/69
See application file for complete search history.

(56) References Cited

U.S. PATENT DOCUMENTS

| | | | |
|---|---|---|---|
| 2008/0165043 A1* | 7/2008 | Wiesbauer | H03M 3/484 341/143 |
| 2010/0034482 A1* | 2/2010 | Jang | G06T 5/50 382/275 |
| 2011/0170607 A1* | 7/2011 | Carmichael | H04N 19/51 375/240.18 |
| 2014/0163998 A1* | 6/2014 | Cormier | G10L 19/04 704/500 |
| 2014/0348250 A1* | 11/2014 | Cho | H04N 19/86 375/240.29 |
| 2016/0093273 A1* | 3/2016 | Wang | G01S 3/781 345/428 |
| 2017/0278221 A1* | 9/2017 | Ji | G06F 3/017 |
| 2020/0154064 A1* | 5/2020 | Berner | H04N 5/35518 |

FOREIGN PATENT DOCUMENTS

| | | |
|---|---|---|
| KR | 101778461 B1 | 9/2017 |
| KR | 1020170110505 A | 10/2017 |
| KR | 1020190102021 A | 9/2019 |

OTHER PUBLICATIONS

Haung et al, ECG compression using the context modeling arithmetic coding with dynamic learning vector-scalar quantization, Biomedical Signal Processing and Control vol. 8, Issue 1, Jan. 2013, pp. 59-65 (Year: 2013).*

* cited by examiner

APPARATUS AND METHOD FOR SENSING IMAGE BASED ON EVENT

CROSS REFERENCE TO RELATED APPLICATION

This application claims the benefit of Korean Patent Application No. 10-2020-0188660, filed Dec. 31, 2020, which is hereby incorporated by reference in its entirety into this application.

BACKGROUND OF THE INVENTION

1. Technical Field

The disclosed embodiment relates to technology for acquiring image event information varying along a time axis.

2. Description of the Related Art

Generally, image signal acquisition devices acquire brightness values and color values of an area imaged through a lens in the form of pixels.

Unlike such devices, event-based visual sensors selectively acquire only pixels, the values of which change along a time axis, for image signals. That is, event-based visual sensors use an image characteristic whereby an area including changes is more important than other areas having no changes. Event-based visual sensors have advantages in that information can be quickly extracted and in that the amount of created data and power consumption are reduced compared with the existing image acquisition method.

As a representative example of such event-based image acquisition devices, there is a dynamic vision sensor (DVS), and the dynamic vision sensor is widely used in various application fields.

A color camera, which is a standard image sensor (or vision sensor), forms video by acquiring consecutive pictures called frames. Each of the frames acquired through such a color camera includes brightness and color information of the entire area viewed through a lens, and this information is used in various application fields using image information.

However, the existing image acquisition method may impose limitations when applied in some application fields.

First, for the entire area viewed through a lens, the brightness and color values of all of the pixels therein are acquired through the same process, and the difference in importance between respective local areas therein is not considered.

Also, because all of the pixels within a frame have the same exposure time, when both a bright area and a dark area are included in the image, it is difficult to acquire accurate color information from the bright area when the exposure time is relatively long, and it is difficult to acquire accurate color information from the dark area when the exposure time is relatively short.

Also, as a fundamental problem with general video acquisition methods, there is motion blur, which causes image quality degradation due to movement of an object. Here, "motion blur" indicates the situation in which, when video contains a moving object, the moving object is blurred in the direction in which the object is moving due to the time difference caused by scanning individual pixels forming a frame one by one, and the degree of blurring varies in proportion to the speed of the moving object. In order to reduce motion blur, a method of raising the frame rate to be higher than a generally used 30 frames per second (fps) (e.g., 100-1000 fps) may be used. However, a camera having a high frame rate is relatively expensive, and is not suitable for low-cost applications.

Meanwhile, dynamic vison sensors propose a new solution for application fields for fast-moving objects. In the dynamic vision sensor, which operates based on the same principle as the human iris, only when local changes in the brightness values occur due to motion is information thereabout transmitted in pixel units to an image-processing device, rather than continuously transmitting frames thereto. That is, the dynamic vision sensor uses a method in which only pixels, the brightness values of which change along a time axis, are selected and information about the locations of the pixels is transmitted, rather than acquiring the brightness values of all of the areas viewed through a lens by applying the same settings to all of the areas, as in conventional cameras.

To this end, the dynamic vision sensor applies logarithmic conversion to the brightness components of an input image so as to be suitable for the characteristics of the human vision system, extracts each pixel when the difference between the brightness value thereof and the brightness value of a corresponding pixel in a previous image, to which logarithmic conversion is applied, exceeds a threshold value, detects whether the brightness value increases or decreases, and generates an output value based thereon.

However, the existing dynamic vision sensor may have the following limitations.

First, the existing dynamic vision sensor applies logarithmic conversion to a previous image and a current image and generates pixel values only for pixels having a change equal to or greater than a preset threshold. Accordingly, only changed pixels in the image may be extracted, and there is an advantage in that a high frame rate may be achieved because only a small amount of data is generated. However, the dynamic vision sensor has a limitation in that pixel values may be output without change even if noise is generated due to a change in illumination into an unwanted form in a scene (e.g., in a dark scene, a car suddenly moves and an unexpected change in illumination is thus caused) or due to the performance limits of an image acquisition device when brightness/color information is acquired.

Also, the existing dynamic vision sensor is limitedly able to effectively use color information. That is, because logarithm conversion and calculation of a difference are performed on the acquired brightness values, if an application acquires event pixels for a red-colored object, the existing dynamic vision sensor cannot be applied thereto unless a process of attaching an additional device or the like is performed.

Finally, in the case of the existing dynamic vision sensor, when an object moves at a low speed in the video, the number of generated pixels decreases. The decrease in the number of pixels may result in a performance degradation when the dynamic vision sensor is combined with an object detection method using a neural network, which is receiving a lot of attention these days. This is because the trustworthiness of the output of the neural network is guaranteed only when more than a certain amount of image information is provided as the input of the neural network when object detection using the neural network is used.

DOCUMENTS OF RELATED ART (Patent Document 1) Korean Publication No. 10-2019-0102021.

SUMMARY OF THE INVENTION

An object of an embodiment is to minimize the effect of noise generated due to a change in illumination into an unwanted form or due to the performance limits of an image acquisition device when brightness/color information is acquired.

Another object of an embodiment is to enable selective extraction of event pixels depending on the color or pattern of an object of interest without the use of an additional device by effectively using the color information of an image signal.

A further object of an embodiment is to prevent the degradation of performance of object detection based on a neural network, which results from a decrease in the number of extracted pixels when the speed of movement of an object is low in an image signal or when there is little change in brightness in the image signal.

An apparatus for sensing an image based on an event according to an embodiment includes memory in which at least one program is recorded and a processor for executing the program. The program may perform acquiring at least one of brightness information and color information from an input image signal; performing conversion including at least one of filtering of at least one of the acquired brightness information and color information, color conversion, and brightness conversion; calculating a quantized difference for each pixel between a first converted image, converted from the currently input image signal, and a second converted image, converted from a previously input image signal; and generating a bitstream for a pixel having a change on a time axis based on the quantized difference.

Here, performing the conversion may include at least one of converting the color information into monochrome brightness information; converting original color information into other color information; performing brightness-based conversion including gamma correction, increasing a brightness value, and decreasing the brightness value; performing frequency-based conversion including conversion based on at least one of a low-pass filter, a high-pass filter, and a band-pass filter; performing conversion based on a wavelet filter; and performing conversion based on a nonlinear filter including a bilateral filter and a morphological filter.

Here, when the second converted image comprises multiple second converted images, calculating the quantized difference may be configured to compute a weighted sum of the multiple second converted images based on respective weights assigned to the multiple second converted images and to calculate a difference from the first converted image, where the sum of the weights may be '1'.

Here, when the second converted image comprises multiple second converted images, calculating the quantized difference may be configured to perform at least one of binary operations including an AND operation and an OR operation, which are operations for binary images, for the multiple second converted images.

Here, calculating the quantized difference may be configured to quantize a difference, the absolute value of which is equal to or greater than a predetermined threshold.

Here, the predetermined threshold may be adjusted depending on the speed of movement of an object included in the image signal or a change in brightness.

Here, calculating the quantized difference may include filtering the quantized difference.

Here, generating the bitstream may be configured to output information about the time at which the image signal is input, information about the location of a pixel, the quantized difference of which is not 0, and binarized information of the quantized difference.

Here, the binarized information of the quantized difference may be '1' when the quantized difference is a positive number, and may be '0' when the quantized difference is a negative number.

A method for generating image event information according to an embodiment may include acquiring at least one of brightness information and color information from an input image signal; performing conversion including at least one of filtering of at least one of the acquired brightness information and color information, color conversion, and brightness conversion; calculating a quantized difference for each pixel between a first converted image, converted from the currently input image signal, and a second converted image, converted from a previously input image signal; and generating a bitstream for a pixel having a change on a time axis based on the quantized difference.

Here, performing the conversion may include at least one of converting the color information into monochrome brightness information; converting original color information into other color information; performing brightness-based conversion including gamma correction, increasing a brightness value, and decreasing the brightness value; performing frequency-based conversion including conversion based on at least one of a low-pass filter, a high-pass filter, and a band-pass filter; performing conversion based on a wavelet filter; and performing conversion based on a nonlinear filter including a bilateral filter and a morphological filter.

Here, when the second converted image comprises multiple second converted images, calculating the quantized difference may be configured to compute a weighted sum of the multiple second converted images based on respective weights assigned to the multiple second converted images and to calculate a difference from the first converted image, where the sum of the weights may be '1'.

Here, when the second converted image comprises multiple second converted images, calculating the quantized difference may be configured to perform at least one of binary operations including an AND operation and an OR operation, which are operations for binary images, for the multiple second converted images. Here, calculating the quantized difference may be configured to quantize a difference, the absolute value of which is equal to or greater than a predetermined threshold.

Here, the predetermined threshold may be adjusted depending on the speed of movement of an object included in the image signal or a change in brightness.

Here, calculating the quantized difference may include filtering the quantized difference.

Here, generating the bitstream may be configured to output information about the time at which the image signal is input, information about the location of a pixel, the quantized difference of which is not 0, and binarized information of the quantized difference.

Here, the binarized information of the quantized difference may be '1' when the quantized difference is a positive number, and may be '0' when the quantized difference is a negative number.

A method for generating image event information according to an embodiment may include acquiring at least one of brightness information and color information from an input image signal; performing conversion including at least one of filtering of at least one of the acquired brightness information and color information, color conversion, and brightness conversion; calculating a difference between a first converted image, converted from the currently input image signal, and a second converted image, converted from a previously input image signal; quantizing the difference, the absolute value of which is equal to or greater than a predetermined threshold; filtering the quantized difference; and generating a bitstream from information about the time at which the image signal is input, information about the location of a pixel, the filtered quantized difference of which is not '0', and binarized information of the quantized difference.

Here, performing the conversion may include at least one of converting the color information into monochrome brightness information; converting original color information into other color information; performing brightness-based conversion including gamma correction, increasing a brightness value, and decreasing the brightness value; performing frequency-based conversion including conversion based on at least one of a low-pass filter, a high-pass filter, and a band-pass filter; performing conversion based on a wavelet filter; and performing conversion based on a non-linear filter including a bilateral filter and a morphological filter.

Here, when the second converted image comprises multiple second converted images, calculating the difference may be configured to compute a weighted sum of the multiple second converted images based on respective weights assigned to the multiple second converted images and calculate a difference from the first converted image, where the sum of the weights may be '1'.

Here, when the second converted image comprises multiple second converted images, calculating the difference may be configured to perform at least one of binary operations including an AND operation and an OR operation, which are operations for binary images, for the multiple second converted images.

Here, the binarized information of the quantized difference may be '1' when the quantized difference is a positive number, and may be '0' when the quantized difference is a negative number.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

Figure 1:
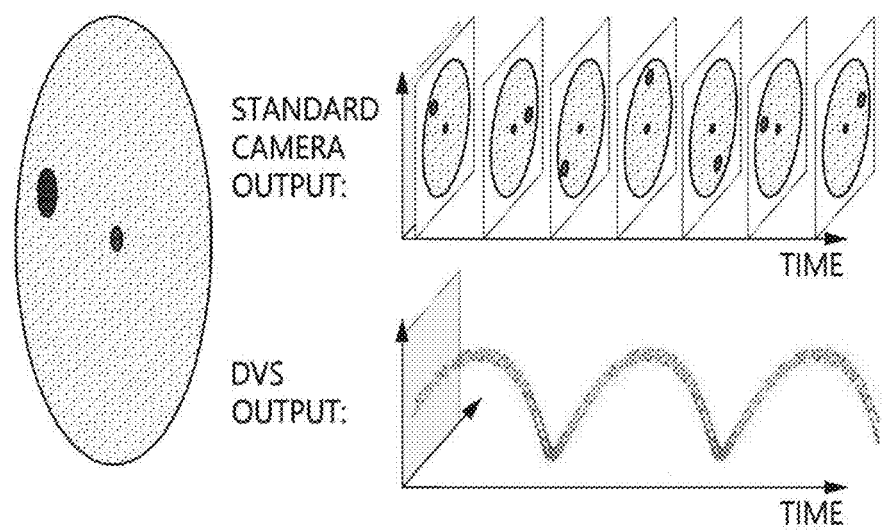
FIG. 1 is a comparison view for comparing an image acquisition method of a standard camera with that of a dynamic vision sensor to which an embodiment is applied.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," w % ben used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for sensing an image based on an event according to an embodiment will be described in detail with reference to FIGS. 1 to 6.

First, a dynamic vision sensor to which an apparatus for sensing an image based on an event according to an embodiment is applied will be briefly described.

FIG. 1 is a comparison view illustrating an image acquisition method of a standard camera and that of a dynamic vision sensor to which an embodiment is applied.

Referring to FIG. 1, it is assumed that a black point is present on a circular plate and that the circular plate rotates.

Here, the standard camera acquires image signals for all of the areas in the direction of a time axis and outputs the same.

However, the dynamic vision sensor (DVS) selectively extracts only the point on the circular plate that corresponds to the area, the brightness of which changes along the time axis, and transmits location data pertaining thereto. This image acquisition method enables microsecond resolution on the time axis, thereby realizing time resolution higher than that provided by a high-speed camera capable of capturing thousands of frames per second. Furthermore, because power consumption and required data storage can be significantly reduced, there is an advantage in that the dynamic range of a sensor, which is the range of brightness capable of being sensed by the sensor, may be significantly increased.

The disclosed embodiment proposes an apparatus and method for sensing an image based on an event, which may minimize the effects of noise generated due to a change in illumination into an unwanted form or due to the performance limits of an image acquisition device when brightness/color information is acquired in such a general dynamic vision sensor.

Also, in order to overcome the limitation in which a general dynamic vision sensor is not able to use color information, the disclosed embodiment proposes an apparatus and method for sensing an image based on an event, the apparatus and method enabling event pixels to be selectively extracted depending on the color or pattern of an object of interest without the use of an additional device by effectively using the color information of an image signal.

Also, the disclosed embodiment proposes an apparatus and method for sensing an image based on an event, through which the degradation of performance of neural-network-based object detection, which is caused due to a decrease in the number of extracted pixels when the speed of movement of an object is low or when there is little change in brightness in an image signal in a general dynamic vision sensor, may be prevented.

Figure 2:
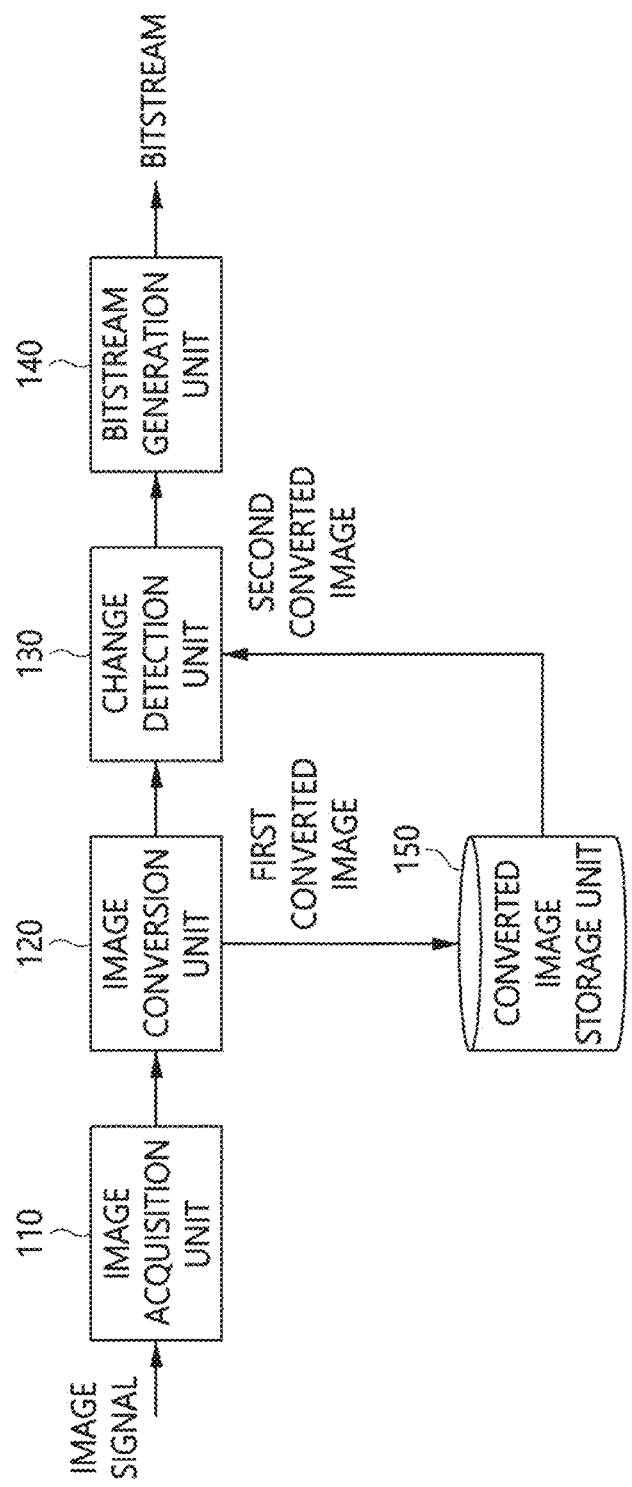
FIG. 2 is a schematic block diagram of an apparatus for sensing an image based on an event according to an embodiment.
Figure 3:
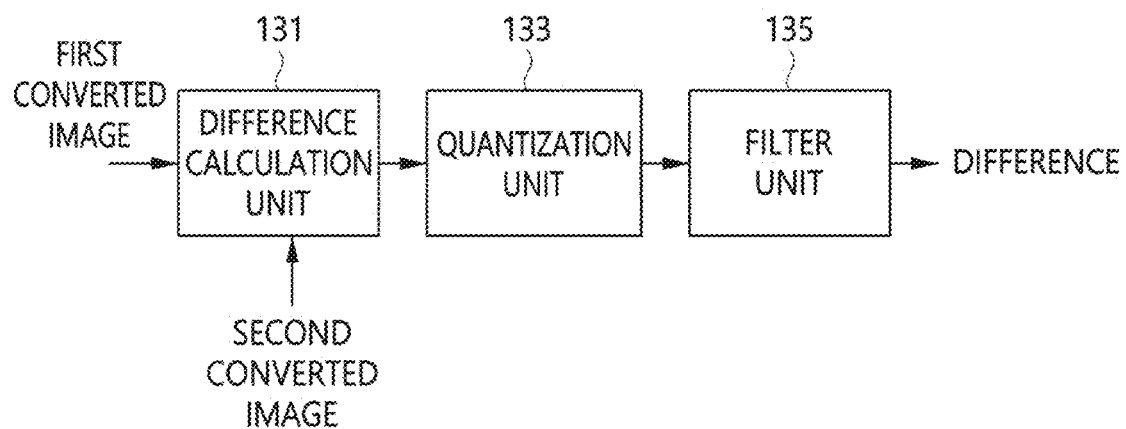
FIG. 3 is a schematic block diagram of a change detection unit according to an embodiment.
Figure 4:
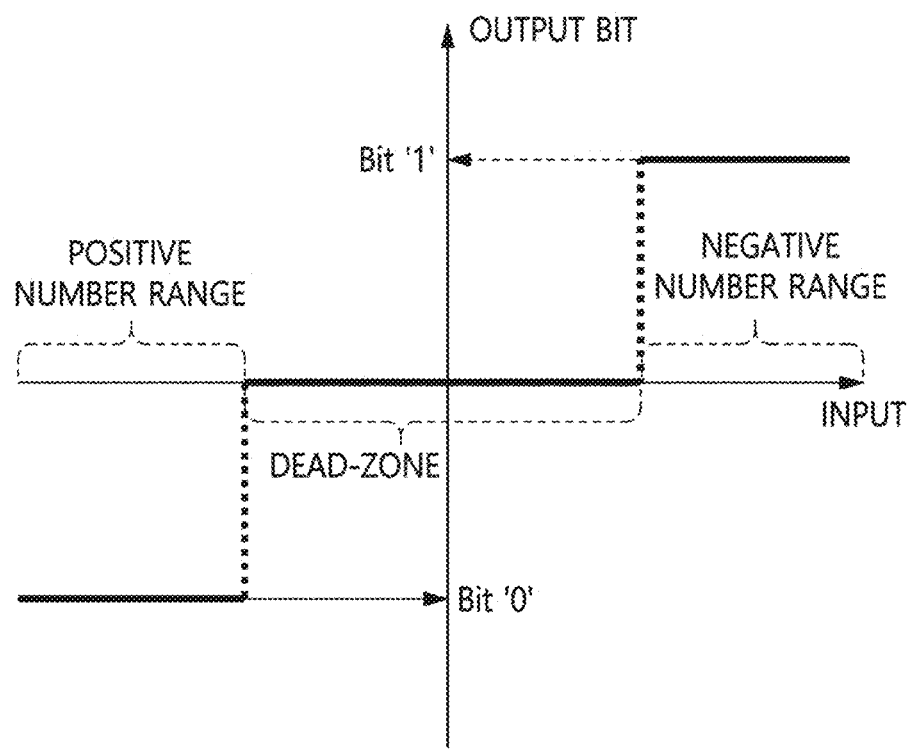
FIG. 4 is a view illustrating the relationship between a quantized difference and an output bit according to an embodiment.

FIG. 2 is a schematic block diagram of an apparatus for sensing an image based on an event according to an embodiment, FIG. 3 is a schematic block diagram of a change detection unit according to an embodiment, and FIG. 4 is a view illustrating the relationship between a quantized difference and an output bit according to an embodiment.

Referring to FIG. 2, an apparatus for sensing an image based on an event according to an embodiment may include an image acquisition unit 110, an image conversion unit 120, a change detection unit 130, a bitstream generation unit 140, and a converted image storage unit 150.

The image acquisition unit 110 may acquire image information including at least one of brightness information and color information from an input image signal.

Here, the image acquisition unit 110 includes an optical lens and a photosensitive device, and shape information in a digital form may be acquired thereby. That is, for the area acquired through the optical lens, an image configured with 2D pixels may be acquired using a photosensitive semiconductor device, such as a Charge-Coupled Device (CCD) or a Complementary Metal-Oxide Semiconductor (CMOS).

Here, the acquired image information may be a simple monochrome brightness image or a color image configured with RGB values.

The image conversion unit 120 may perform conversion, including at least one of filtering of at least one of the acquired brightness information and color information, color conversion, and brightness conversion.

That is, an embodiment may reduce the effects of a rapid change in brightness by further applying conversion in addition to logarithmic conversion, rather than applying only logarithmic conversion in order to represent only an increase or decrease in a change in the brightness according to the conventional art, and may minimize the number of event pixels generated due to noise. Also, an embodiment may enable event pixels to be selectively extracted depending on the color or pattern of an object of interest by performing color conversion.

Here, the image conversion unit 120 includes multiple conversion units, and may consecutively operate one or more selected therefrom.

According to an embodiment, the image conversion unit 120 may include at least one of a conversion unit for converting color information into monochrome brightness information, a conversion unit for converting original color information into other color information, a conversion unit for brightness-based conversion including gamma correction, increasing a brightness value, and decreasing a brightness value, a conversion unit for frequency-based conversion including at least one of a low-pass filter, a high-pass filter, and a band-pass filter, a conversion unit for conversion based on a wavelet filter, and a conversion unit for conversion based on a nonlinear filter including a bilateral filter and a morphological filter.

The change detection unit 130 may calculate a quantized difference for each pixel between a first converted image, converted from the currently input image signal, and a second converted image, converted from the previously input image signal. That is, a change in each pixel between images on the time axis is calculated.

Here, the first converted image may be output from the image conversion unit 120, and the second conversion image may be extracted from the converted image storage unit 150.

Here, the converted image storage unit 150 may store the image converted by the image conversion unit 120 along with time information pertaining thereto. Accordingly, over time, the converted images may be sequentially stored in the converted image storage unit 150 at a predetermined time interval. Here, the predetermined time interval may be, for example, one second.

By storing the converted images as described above, it may be expected that an image event will be acquired and processed robustly in spite of momentarily occurring noise or camera movement.

Referring to FIG. 3, the change detection unit 130 may include a difference calculation unit 131, a quantization unit 133, and a filter unit 135.

The difference calculation unit 131 may calculate a difference between the first converted image and the second converted image for each pixel.

Here, one or more converted images may be extracted as the second converted image.

Here, when multiple second converted images are extracted, the difference calculation unit 131 may compute a weighted sum of the second converted images based on respective weights assigned to the second converted images, and may then calculate the difference from the first converted image. That is, the difference D(t) may be calculated as shown in the following Equation (1):

$$D(t) = T(t) - \sum_{i=1}^{m} \omega_i \cdot T(t-i), \left(0 \leq \omega_i \leq 1, \sum_{i=1}^{m} \omega_i = 1\right) \quad (1)$$

In Equation (1), T(t) denotes the first converted image value, T(t−1), T(t−2), . . . , T(t−m) denote the multiple second converted image values, and aw is the weight assigned to the i-th second converted image. Here, the sum of the weights may be '1'.

Here, when multiple second converted images are extracted, the difference calculation unit 131 may perform at least one of binary operations including an 'AND' operation and an 'OR' operation, which are operations for binary images, on the multiple second converted images.

That is, when an 'OR' operation is performed, the difference calculation unit 131 may select all of the pixels changed at least once on the time axis from the multiple second converted images, and may calculate the difference between the first converted image and the second converted images for each of the selected pixels.

Also, when an 'AND' operation is performed, the difference calculation unit 131 may select only pixels that always change on the time axis from the multiple second converted images, and may calculate the difference between the first converted image and the second converted images for each of the selected pixels.

Meanwhile, the quantization unit 133 quantizes the difference for each pixel, which is calculated by the difference calculation unit 131. This serves to represent the difference using a limited number of bits while minimizing information loss.

Here, the quantization unit 133 may quantize the difference, the absolute value of which is equal to or greater than a predetermined threshold.

That is, when the range of the converted image value is $T_{min} \leq T(t) \leq T_{max}$, the range of the difference D(t) may be defined as shown in the following Equation (2):

$$T_{min} - T_{max} \leq D(t) \leq T_{max} - T_{min} \qquad (2)$$

The quantization unit 133 excludes a dead zone, which is defined as a range of values, from which the distance to zero is less than the predetermined threshold, from the range of the difference D(t) specified in Equation (2), and quantizes only the difference, the absolute value of which is equal to or greater than the predetermined threshold.

Here, the predetermined threshold may be adjusted depending on the speed of movement of an object included in the image signal or a change in brightness.

When the speed of movement of an object is low or when a change in brightness is small, the number of generated event pixels may decrease. This decrease in the number of pixels may significantly degrade performance when this technology is combined with object detection technology using a neural network, which is receiving a lot of attention these days. This is because, when object detection using a neural network is attempted, the trustworthiness of the result output from the neural network can be guaranteed only when more than a certain amount of image information is provided as the input for the neural network. Therefore, according to an embodiment, the threshold is adjusted depending on the speed of movement of an object or a change in brightness, whereby an image having a number of event pixels sufficient to guarantee trustworthiness may be generated.

Meanwhile, the quantization unit 133 may perform uniform quantization having a fixed quantization interval or non-uniform quantization having a variable quantization interval.

The filter unit 135 filters the quantized difference for each pixel, which is output from the quantization unit 133.

The filter unit 135 deletes or copies the quantized difference of a specific pixel, thereby making the value similar to neighboring values.

Also, the filter unit 135 may perform morphological filtering such that a cluster of pixels has a simple shape.

Through the operation of the filter unit 135, even when there is little motion or only a small change in brightness, event information required in various application fields may be appropriately adjusted.

The bitstream generation unit 140 generates information about pixels having a change on the time axis as a bitstream based on the quantized difference.

Here, information about a pixel having a change on the time axis may include information about the time at which the image signal is input, information about the location of a pixel, the quantized difference of which is nonzero, and binarized information of the quantized difference.

For example, the information about the location of the pixel may be represented as an image frame configured with "0"s and "1"s by representing a pixel, the value of which is not specified, as "0" and representing a pixel, the value of which is specified, as "1".

For example, referring to FIG. 4, when the quantized difference falls within the dead zone, binarized information therefor is not generated, when the quantized difference falls within a positive number range, a bit "1" may be assigned as the binarized information of the quantized difference, and when the quantized difference falls within a negative number range, a bit "0" may be assigned as the binarized information of the quantized difference.

Figure 5:
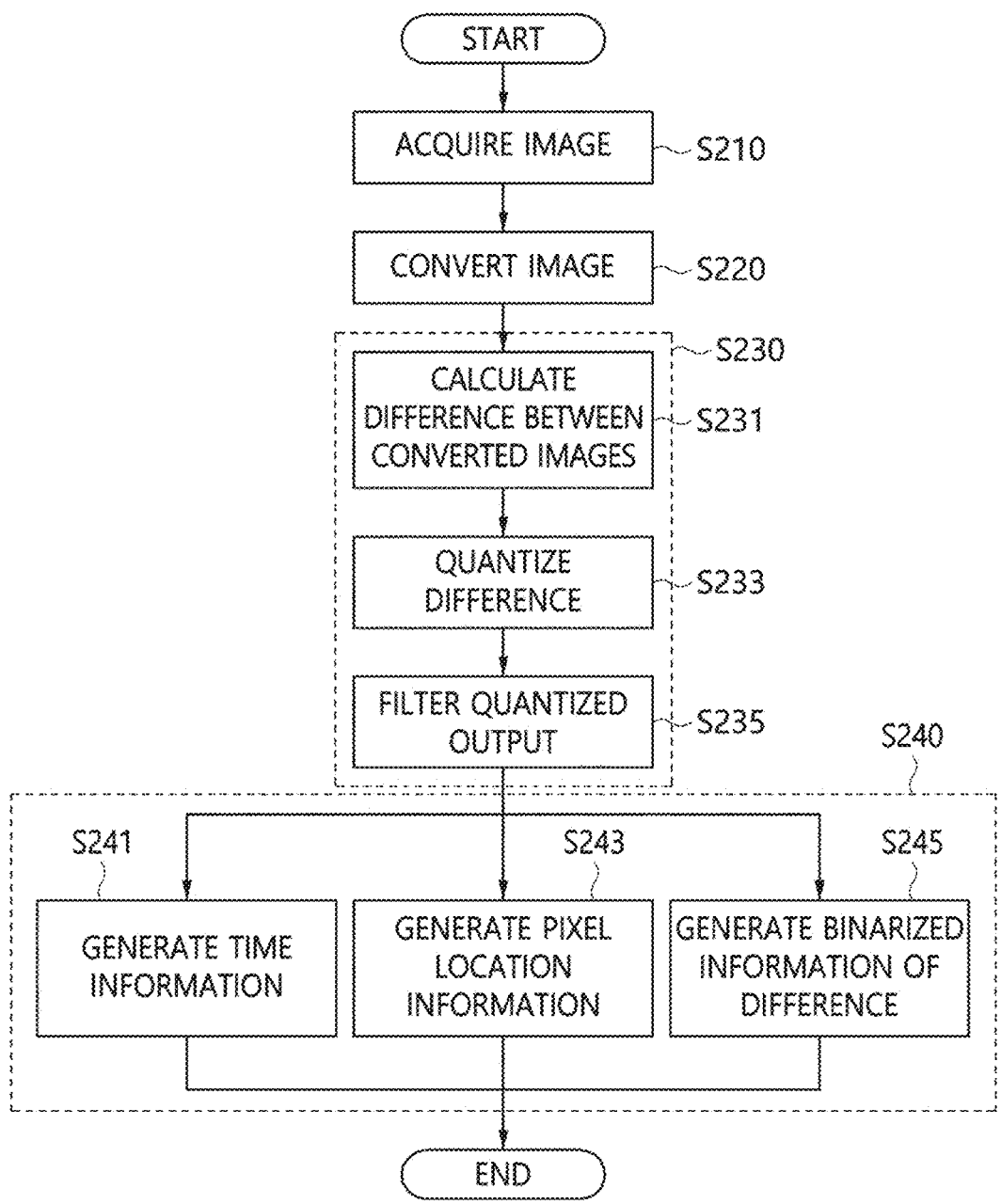
FIG. 5 is a flowchart for explaining a method for sensing an image based on an event according to an embodiment.

FIG. 5 is a flowchart for explaining a method for sensing an image based on an event according to an embodiment.

Referring to FIG. 5, the method for sensing an image based on an event according to an embodiment may include acquiring at least one of brightness information and color information from an input image signal at step S210, performing conversion including at least one of filtering of at least one of the acquired brightness information and color information, color conversion, and brightness conversion at step S220, calculating a quantized difference between a first converted image converted from the currently input image signal and a second converted image converted from a previously input image signal at step S230, and generating a bitstream for pixels having a change on the time axis based on the quantized difference at step S240.

Here, performing the conversion at step S220 may be configured to consecutively perform at least one of conversion of the color information into monochrome brightness information, conversion of original color information into other color information, brightness-based conversion including gamma correction, increasing a brightness value, and decreasing a brightness value, frequency-based conversion including conversion using at least one of a low-pass filter, a high-pass filter, and a band-pass filter, conversion based on a wavelet filter, and conversion based on a nonlinear filter including a bilateral filter and a morphological filter.

Here, calculating the quantized difference at step S230 is configured to calculate a change in each pixel between images on the time axis, and may include calculating a difference for each pixel between the first converted image and the second converted image at step S231, quantizing the calculated difference for each pixel at step S223, and filtering the quantized difference for each pixel at step S235.

Here, the second converted image may be previously stored at a predetermined time interval.

Here, one or more images may be extracted as the second converted image.

Here, when multiple second converted images are extracted, calculating the difference for each pixel at step S231 may be configured to compute the weighted sum of the second converted images based on respective weights assigned to the second converted images and to calculate the difference from the first converted image. Here, the sum of the weights may be '1'. That is, the difference D(t) may be calculated as shown in the above Equation (1).

Also, quantizing the calculated difference for each pixel at step S233 may be configured to quantize the difference, the absolute value of which is equal to or greater than a predetermined threshold. That is, when the difference D(t) falls within the range specified in the above Equation (2), a dead zone, which is defined as a range of values, from which the distance to zero is less than a predetermined threshold, is excluded therefrom, and the difference, the absolute value of which is equal to or greater than the predetermined threshold, is quantized.

Here, the predetermined threshold may be adjusted depending on the speed of movement of an object included in the image signal or a change in brightness.

Also, quantizing the calculated difference for each pixel at step S223 may be configured to perform uniform quantization having a fixed quantization interval or non-uniform quantization having a varying quantization interval.

Meanwhile, filtering the quantized difference for each pixel at step S235 is configured such that pixels having a relatively small quantized difference are deleted, or the quantized difference of a specific pixel is deleted or copied, whereby the value may be made similar to neighboring values. Also, filtering the quantized difference for each pixel at step S235 may be configured to perform morphological filtering such that a cluster of pixels has a simple shape.

Here, generating the bitstream at step S240 may include generating information about the time at which the image signal is input at step S241, generating information about the location of the pixel, the quantized difference of which is not 0, at step S243, and generating binarized information of the quantized difference for the pixel, the quantized difference of which is not 0, at step S245.

Figure 6:
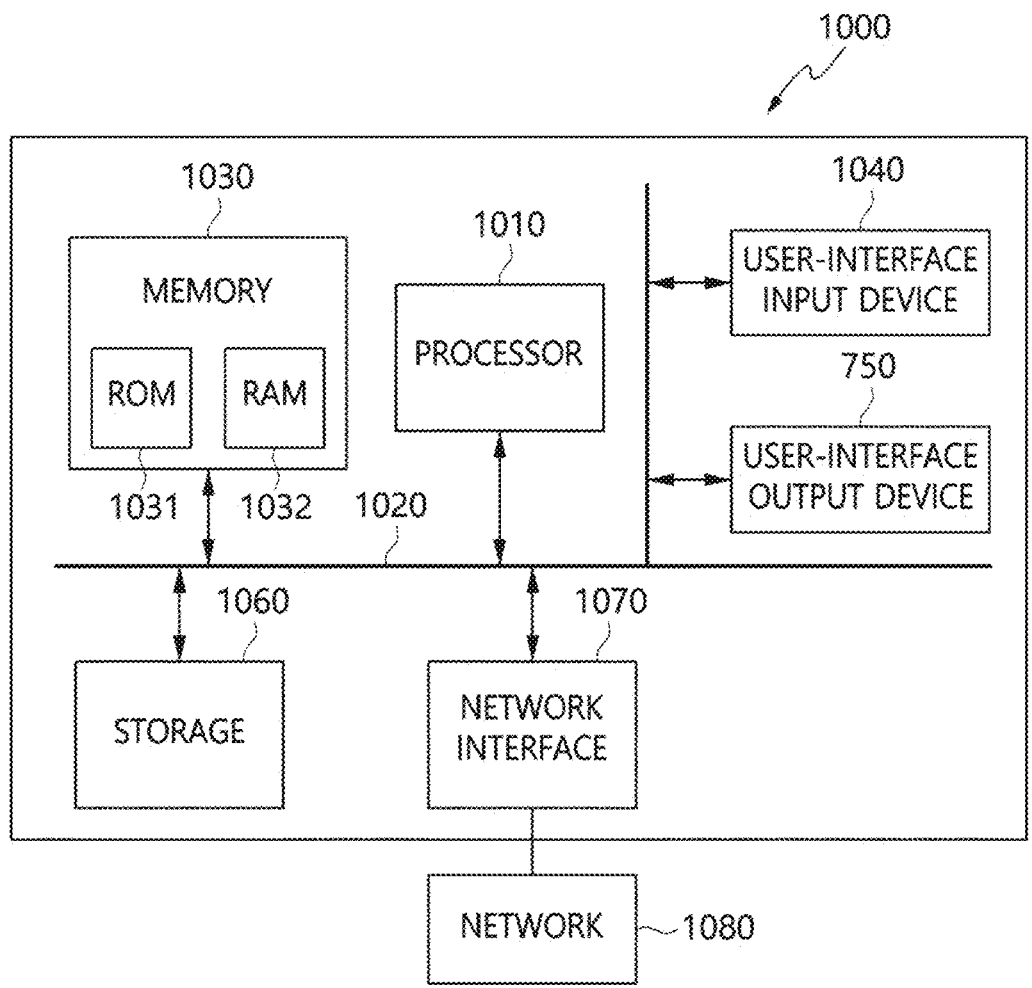
FIG. 6 is a view illustrating a computer system configuration according to an embodiment.

FIG. 6 is a view illustrating a computer system configuration according to an embodiment.

The apparatus for sensing an image based on an event according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, and an information delivery medium. For example, the memory 1030 may include ROM 1031 or RAM 1032.

According to an embodiment, the effect of noise, which is generated due to a change in illumination into an unwanted form or due to the performance limits of an image acquisition device when brightness/color information is acquired, may be minimized.

According to an embodiment, event pixels may be selectively extracted depending on the color or pattern of an object of interest without the use of an additional device by effectively using the color information of an image signal.

According to an embodiment, the degradation of performance of object detection based on a neural network, which results from a decrease in the number of extracted pixels when the speed of movement of an object is low in an image signal or when there is little change in brightness in the image signal, may be prevented.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. An apparatus for sensing an image based on an event, comprising:
   memory in which at least one program is recorded; and
   a processor for executing the program,
   wherein the program performs
   acquiring at least one of brightness information and color information from an input image signal,
   performing conversion including at least one of filtering of at least one of the acquired brightness information and color information, brightness conversion, and color conversion,
   calculating a quantized difference for each pixel between a first converted image, converted from the currently input image signal, and a second converted image, converted from a previously input image signal, and
   generating a bitstream for a pixel having a change on a time axis based on the quantized difference;
   wherein:
   when the second converted image comprises multiple second converted images, calculating the quantized difference is configured to compute a weighted sum of the multiple second converted images based on respective weights assigned to the multiple second converted images and to calculate a difference from the first converted image,
   where a sum of the weights is '1'.

2. The apparatus of claim 1, wherein performing the conversion includes at least one of:
   converting the color information into monochrome brightness information;
   converting original color information into other color information;
   performing brightness-based conversion including gamma correction, increasing a brightness value, and decreasing the brightness value;
   performing frequency-based conversion including conversion based on at least one of a low-pass filter, a high-pass filter, and a band-pass filter;
   performing conversion based on a wavelet filter; and
   performing conversion based on a nonlinear filter including a bilateral filter and a morphological filter.

3. The apparatus of claim 1, wherein:
   when the second converted image comprises multiple second converted images,
   calculating the quantized difference is configured to:
   select all of pixels that change at least once on the time axis from the multiple second converted images and calculate a difference between the first converted image and the second converted images for each of the selected pixels, or select only pixels that always change on the time axis from the multiple second converted images and calculate a difference between the first converted image and the second converted images for each of the selected pixels.

4. The apparatus of claim 1, wherein:
calculating the quantized difference is configured to quantize a difference, an absolute value of which is equal to or greater than a predetermined threshold, and
the predetermined threshold is adjusted depending on a speed of movement of an object included in the image signal or a change in brightness.

5. The apparatus of claim 1, wherein calculating the quantized difference comprises:
filtering the quantized difference.

6. The apparatus of claim 1, wherein generating the bitstream is configured to output information about a time at which the image signal is input, information about a location of a pixel, the quantized difference of which is not 0, and binarized information of the quantized difference.

7. The apparatus of claim 6, wherein the binarized information of the quantized difference is '1' when the quantized difference is a positive number and is '0' when the quantized difference is a negative number.

8. A method for sensing an image based on an event, comprising:
acquiring at least one of brightness information and color information from an input image signal;
performing conversion including at least one of filtering of at least one of the acquired brightness information and color information, color conversion, and brightness conversion;
calculating a quantized difference for each pixel between a first converted image, converted from the currently input image signal, and a second converted image, converted from a previously input image signal; and
generating a bitstream from information about a pixel having a change on a time axis based on the quantized difference;
wherein:
when the second converted image comprises multiple second converted images, calculating the quantized difference is configured to compute a weighted sum of the multiple second converted images based on respective weights assigned to the multiple second converted images and to calculate a difference from the first converted image,
where a sum of the weights is '1'.

9. The method of claim 8, wherein performing the conversion includes at least one of:
converting the color information into monochrome brightness information;
converting original color information into other color information;
performing brightness-based conversion including gamma correction, increasing a brightness value, and decreasing the brightness value;
performing frequency-based conversion including conversion based on at least one of a low-pass filter, a high-pass filter, and a band-pass filter;
performing conversion based on a wavelet filter; and
performing conversion based on a nonlinear filter including a bilateral filter and a morphological filter.

10. The method of claim 8, wherein:
when the second converted image comprises multiple second converted images,
calculating the quantized difference is configured to:
select all of pixels that change at least once on the time axis from the multiple second converted images and calculate a difference between the first converted image and the second converted images for each of the selected pixels, or
select only pixels that always change on the time axis from the multiple second converted images and calculate a difference between the first converted image and the second converted images for each of the selected pixels.

11. The method of claim 8, wherein:
calculating the quantized difference is configured to quantize a difference, an absolute value of which is equal to or greater than a predetermined threshold, and
the predetermined threshold is adjusted depending on a speed of movement of an object included in the image signal or a change in brightness.

12. The method of claim 8, wherein calculating the quantized difference comprises:
filtering the quantized difference.

13. The method of claim 8, wherein generating the bitstream is configured to output information about a time at which the image signal is input, information about a location of a pixel, the quantized difference of which is not 0, and binarized information of the quantized difference.

14. The method of claim 13, wherein the binarized information of the quantized difference is '1' when the quantized difference is a positive number and is '0' when the quantized difference is a negative number.

15. A method for sensing an image based on an event, comprising:
acquiring at least one of brightness information and color information from an input image signal;
performing conversion including at least one of filtering of at least one of the acquired brightness information and color information, color conversion, and brightness conversion;
calculating a difference for each pixel between a first converted image, converted from the currently input image signal, and a second converted image, converted from a previously input image signal;
quantizing the difference, an absolute value of which is equal to or greater than a predetermined threshold;
filtering the quantized difference; and
generating a bitstream from information about a time at which the image signal is input, information about a location of a pixel, the filtered quantized difference of which is not 0, and binarized information of the quantized difference.

16. The method of claim 15, wherein performing the conversion includes at least one of:
converting the color information into monochrome brightness information;
converting original color information into other color information;
performing brightness-based conversion including gamma correction, increasing a brightness value, and decreasing the brightness value;
performing frequency-based conversion including conversion based on at least one of a low-pass filter, a high-pass filter, and a band-pass filter;
performing conversion based on a wavelet filter; and
performing conversion based on a nonlinear filter including a bilateral filter and a morphological filter.

17. The method of claim 15, wherein
when the second converted image comprises multiple second converted images, calculating the difference is configured to:

compute a weighted sum of the multiple second converted images based on respective weights assigned to the multiple second converted images and calculate a difference from the first converted image, select all of pixels that change at least once on the time axis from the multiple second converted images and calculate a difference between the first converted image and the second converted images for each of the selected pixels, or select only pixels that always change on the time axis from the multiple second converted images and calculate a difference between the first converted image and the second converted images for each of the selected pixels.

18. The method of claim 15, wherein the binarized information of the quantized difference is '1' when the quantized difference is a positive number and is '0' when the quantized difference is a negative number.

\* \* \* \* \*